United States Patent [19]
Fukuoka et al.

[11] Patent Number: 5,157,432
[45] Date of Patent: Oct. 20, 1992

[54] CAMERA HAVING A ZOOM LENS UNIT

[75] Inventors: Hidenori Fukuoka; Toru Ishii; Masatoshi Itoh, all of Osaka, Japan

[73] Assignee: Minolta Camera Kabushiki Kaisha, Osaka, Japan

[21] Appl. No.: 727,303

[22] Filed: Jul. 9, 1991

Related U.S. Application Data

[63] Continuation of Ser. No. 404,650, Sep. 8, 1989, abandoned.

[30] Foreign Application Priority Data

Sep. 9, 1988 [JP] Japan ............................... 63-227237
Sep. 9, 1988 [JP] Japan ............................... 63-227238
Sep. 9, 1988 [JP] Japan ............................... 63-227239

[51] Int. Cl.$^5$ ............................................. G03B 13/00
[52] U.S. Cl. ................................ 354/400; 354/195.12
[58] Field of Search ............... 354/400, 195.1, 195.12, 354/402, 403, 406–408; 358/227; 359/676, 677, 696–698

[56] References Cited

U.S. PATENT DOCUMENTS

| | | | |
|---|---|---|---|
| 2,782,683 | 2/1957 | Walker | 350/429 |
| 3,972,066 | 7/1976 | Tsujimoto et al. | 354/402 |
| 4,043,642 | 8/1977 | Hirose et al. | 354/195.12 |
| 4,161,756 | 7/1979 | Thomas | 358/227 |
| 4,705,380 | 11/1987 | Yamamoto et al. | 354/402 |
| 4,735,494 | 4/1988 | Makino et al. | 350/429 |
| 4,935,763 | 6/1990 | Itoh et al. | 354/400 |

FOREIGN PATENT DOCUMENTS 60143309 7/1985 Japan .

Primary Examiner—Russell E. Adams
Assistant Examiner—David M. Gray
Attorney, Agent, or Firm—Burns, Doane, Swecker & Mathis

[57] ABSTRACT

An automatic focusing apparatus according to the present invention comprises a photo-taking lens system, in which a focus has to be adjusted every time the focal length is changed, including at least a first lens unit for changing the focal length by means of its movement along an optical axis of the photo-taking lens during the zooming operation and a second lens unit for adjusting the focus by means of its movement along the optical axis, and a controller for controlling the speed of the second lens unit during the zooming operation based on the focal length of the photo-taking lens system, the lapse of the time related with focus detection cycles, the reliability of the result of the focus detection and so on.

22 Claims, 16 Drawing Sheets

CAMERA HAVING A ZOOM LENS UNIT

This application is a continuation of application Ser. No. 07/404,650, filed Sep. 8, 1989, abandoned.

CROSS REFERENCE TO RELATED, COPENDING APPLICATION

U.S. Ser. No. 150,611
Filing Date: Feb. 1, 1988
Title: Camera Having a Zoom Lens Unit This application was abandoned on Jul. 10, 1989 and a continuation application thereof was filed.

BACKGROUND OF THE INVENTION

1. Field of the Invention

The present invention relates to a camera having an automatic focusing function and particularly to an auto focus camera having a zooming mechanism.

2. Description of the Related Art

In a conventional zoom lens in which focusing operation is performed by using a front lens disposed at an object side end thereof, a distance between a variator lens and a compensator lens is generally regulated by a cam mechanism so that an image position of an object may be fixed independent of zooming operation.

However, in order to make a lens have a small size and a light weight, it is desirable to ensure an in-focus condition during zooming without using such a cam mechanism.

U.S. Pat. No. 2,782,683 discloses that a position of a variator lens and that of a compensator lens are detected by using sliding resistance, whereby a positional relation between the variator lens and the compensator lens is controlled without using a cam mechanism.

In addition, U.S. Pat. No. 4,043,642 discloses a zoom lens which compensates for a shift of the image position by controlling a position of a focus lens according to absolute focal length information of the zoom lens when zooming operation is effected after temporary manual focusing. However, this zoom lens is not associated with an auto focus apparatus. Accordingly, zooming operation is to be performed after the focus has been temporarily adjusted manually. In addition, the absolute focal length information of the zoom lens is required and the position of the focus lens, not the moving speed thereof, is controlled. Therefore, this zoom lens cannot always ensure an in-focus condition during zooming.

In a zoom lens for a single-lens reflex camera, an in-focus condition needs to be set only at the time of releasing the shutter and it is not necessary to maintain the in-focus condition during zooming. Accordingly, it is only necessary to control the position of the compensator lens for focusing based on the result of focus detection. For example, the Japanese Patent Laying-Open No. 50-92127 (/1975) indicates that the compensator is moved based on an output of a focus detecting apparatus.

However, the method described above is simple in construction since it is only necessary to detect a defocus amount of a photo-taking lens and to drive the compensator based on the detected amount. However, if this method is applied to a video camera, the following disadvantages are involved. More specifically, in a video camera, zooming operation is also effected during photographing operation and it is necessary to constantly maintain an in-focus condition during zooming. This will be explained with reference to FIG. 1. A TTL passive type focus detecting apparatus as disclosed in the Japanese Patent Laying-Open No. 60-4914(/1985) for example, that is, a focus detecting apparatus of the so-called phase difference detection system is well known as a focus detecting apparatus for detecting a defocus amount of a photo-taking lens. However, this detecting apparatus is of a charge integration or accumulation type and it causes a time lag corresponding to a period elapsed after integration of a charge representing an amount of light from an object until an end of focus detecting calculation. Such time lag is also caused in a focus detecting apparatus of a contrast detecting type. FIG. 1 represents a follow-up or tracking characteristics of a compensator during zooming in a zoom lens using a focus detecting system causing such time lag for compensating for a shift of the image position, in which zooming is effected from an end of a telephoto range (referred to hereinafter as the tele end) in a direction opposite to the tele end (referred to hereinafter as the wide direction, an end opposite to the tele end of the telephoto range being afterwards referred to as the wide end and a direction toward the tele end being afterwards referred to as the tele direction). The abscissa in FIG. 1 represents lapse of time after the zooming operation, which corresponds to a focal length, and the ordinate represents a movement amount of the compensator. In the figure, the curve A is an ideal follow-up curve of the compensator and the lines B indicate a follow-up locus of the compensator based on a signal of the focus detecting apparatus. It is assumed that the curve A shows a characteristic exhibited when the distance D to the object is infinity ($\infty$). The waveform P shown below the abscissa represents an integration time control pulse for focus detection. A period of a high level of the pulse corresponds to an integration time and a period of a low level thereof corresponds to a focus detecting calculation time. Although the integration time is actually changed dependent on luminance of an object, it is assumed in the figure that the integration time is fixed for simplification of the explanation.

Referring to FIG. 1, assuming that the compensator is first located at a position corresponding to the time T0, the variator is in a stopped state at the time T0 and the compensator is in a stopped state with an in-focus condition being maintained by the focus detecting apparatus. Then, when zooming is started in the wide direction, the variator is moved in the wide direction and the first focus detection, including the first integration and the first detecting calculation, is continued until the time T1. Assuming that zooming and integration are started simultaneously for the purpose of simplification, only the variator is moved in the wide direction with the compensator being stopped in a period from T0 to T1. Accordingly, at T1 when the first integration and the first detecting calculation are terminated, the focus detecting apparatus detects an amount corresponding to DF1 in FIG. 1 as a defocus amount at an integration baricentric position during the integration (i.e., a center of the high-level period of the pulse P). Therefore, there is a time lag corresponding to a period from detection of the defocus amount to completion of the first focus detection. When the defocus amount DF1 is detected at the time T1, the focus compensated (AF) apparatus enables the compensator to start to be moved at a given speed by an amount corresponding to DF1. It is assumed in this case that the given speed is equal to a focus control speed at the time of normal AF operation without zooming and corresponds to the maximum inclination of the ideal follow-up curve A. It is further assumed that after the time T1, the focus detection is also effected during the movement of the compensator so as to maintain a good follow-up characteristic.

As described above, the movement of the compensator is started when the defocus amount is first detected at the time T1. Even if a defocus amount larger than DF1 is already caused at this time, the compensator is only moved by the detected defocus amount DF1 and after that, an in-focus condition is regarded as being set and the movement of the compensator is stopped until the time T2. After the time T1, the subsequent integration is started and a defocus amount DF2 is detected at the time T2 in the same manner, whereby the compensator starts to be moved by an amount corresponding to DF in the same direction at the time T2. Then, at the time T3, a defocus amount DF3 is detected by means of integration while the compensator is being moved. After the compensator is moved by an amount corresponding to DF3−DF3', whereby the DF3' corresponds to a moving amount thereof during a period from the detection of the defocus amount to completion of the third focus detection, the compensator is stopped again at a position shown in the figure at the time T4. In the same manner, defocus amounts DF4 to DF9 are detected at the times T4 to T9, respectively, and the compensator is moved and stopped repeatedly in the same direction at the same speed as previously set. As a result, a large error between the curve A and the lines B is caused by delays in follow-up as shown in the figure and a picture obtained is of a considerably poor quality. This drawback becomes particularly conspicuous in the case of a video camera. However, even in the case of a conventional still camera, the same phenomenon occurs if pictures are successively taken during zooming. In order to cause little error in follow-up, it is effective to shorten each detection cycle of the focus detecting apparatus. However, for that purpose, it is necessary to increase sensitivity of a light receiving element to reduce an integration time, or to use a processing unit having a high speed of calculation. In such cases, the costs are unavoidably increased. Furthermore, if such measures are taken, it is impossible in the above described conventional focus detection method to effectively reduce the errors in follow-up as shown in FIG. 1. Particularly, it is difficult to avoid an excessive defocus caused by a delay in follow-up at the start of zooming or a delay in follow-up at the time of reversing the zooming direction.

Furthermore, if the result of the focus detection may be only used for determining the speed of the compensator during zooming, there is much possibility of causing the large error between the curve A and the lines B when reliability of the result of the focus detection is low.

A method for improving the follow-up characteristic is proposed for example in the U.S. Pat. No. 4,735,494, in which the moving speeds of a compensator are preset for the respective zones of distances to an object and the respective zones of focal length, and the compensator is controlled by selecting any of the preset moving speeds at the time of zooming. Although this method is effectively applied when zooming is made in the same direction, it does not take account of other cases such as reversing of the zooming direction, a rapid change in information of distance to the object or a case in which focus detection is unavoidable. Thus, in such cases, the follow-up characteristic is deteriorated and it takes time to attain suitable focus condition.

SUMMARY OF THE INVENTION

An object of the present invention is to improve a focus adjusting precision in an automatic focus adjusting apparatus.

Another object of the present invention is to improve a focus adjusting precision during zooming operation in an automatic focus adjusting apparatus.

Still another object of the present invention is to improve a focus adjusting precision by reducing dependence upon the result of the focus detection for determining the speed of a focusing lens.

In order to accomplish the above described objects, an automatic focusing apparatus according to an aspect of the present invention comprises: a photo-taking lens system, in which the focus has to be adjusted every time the focal length is changed, including at least a first lens unit for changing the focal length by means of its movement along an optical axis of the photo-taking lens during the zooming operation and a second lens unit for adjusting the focus by means of its movement along the optical axis; and a controller for controlling the speed of the second lens unit during the zooming operation based on the focal length of the photo-taking lens system and the lapse of the time during the zooming operation.

In order to accomplish the above described objects, an automatic focus adjusting apparatus according to another aspect of the present invention comprises: a photo-taking lens system, in which the focus has to be adjusted every time the focal length is changed, including at least a first lens unit for changing the focal length by means of its movement along an optical axis of the photo-taking lens during the zooming operation and a second lens unit for adjusting the focus by means of its movement along the optical axis; a detector for detecting a defocus amount with respect to the photo-taking lens system by using the light passing through the photo-taking lens system; a converter for converting the focal length of the photo-taking lens into a coefficient corresponding to the focal length; a calculator for calculating the speed of the second lens unit using the coefficient corresponding to the focal length and the defocus amount detected by the detector; and a controller for controlling the speed of the second lens unit during the zooming operation based on the calculated value.

In order to accomplish the above described objects, an automatic focus adjusting apparatus according to a further aspect of the present invention comprises: a photo-taking lens system, in which the focus has to be adjusted every time the focal length is changed, including at least a first lens unit for changing the focal length by means of its movement along an optical axis of the photo-taking lens during the zooming operation and a second lens unit for adjusting the focus by means of its movement along the optical axis; and a controller for controlling the speed of the second lens unit during the zooming operation based on the focal length of the photo-taking lens system and the position of the second lens unit along the optical axis of the photo-taking lens system.

In order to accomplish the above described objects, an automatic focus adjusting apparatus according to a still further aspect of the present invention comprises: a photo-taking lens system, in which the focus has to be adjusted every time the focal length is changed, including at least a first lens unit for changing the focal length by means of its movement along an optical axis of the photo-taking lens during the zooming operation and a second lens unit for adjusting the focus by means of its movement along the optical axis; a detector for detecting the focus condition of the photo-taking lens system using the light passing through the photo-taking lens system; and a controller for controlling the speed of the second lens unit during the zooming operation based on the reliability of the result detected by the focus detecting means.

In an automatic focus adjusting apparatus constructed as described above, an in-focus condition can be always maintained with high precision during the zooming operation without using a coupling member such as a cam mechanism between a first lens unit (i.e., a variator lens) and a second lens unit (i.e., a compensator lens).

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
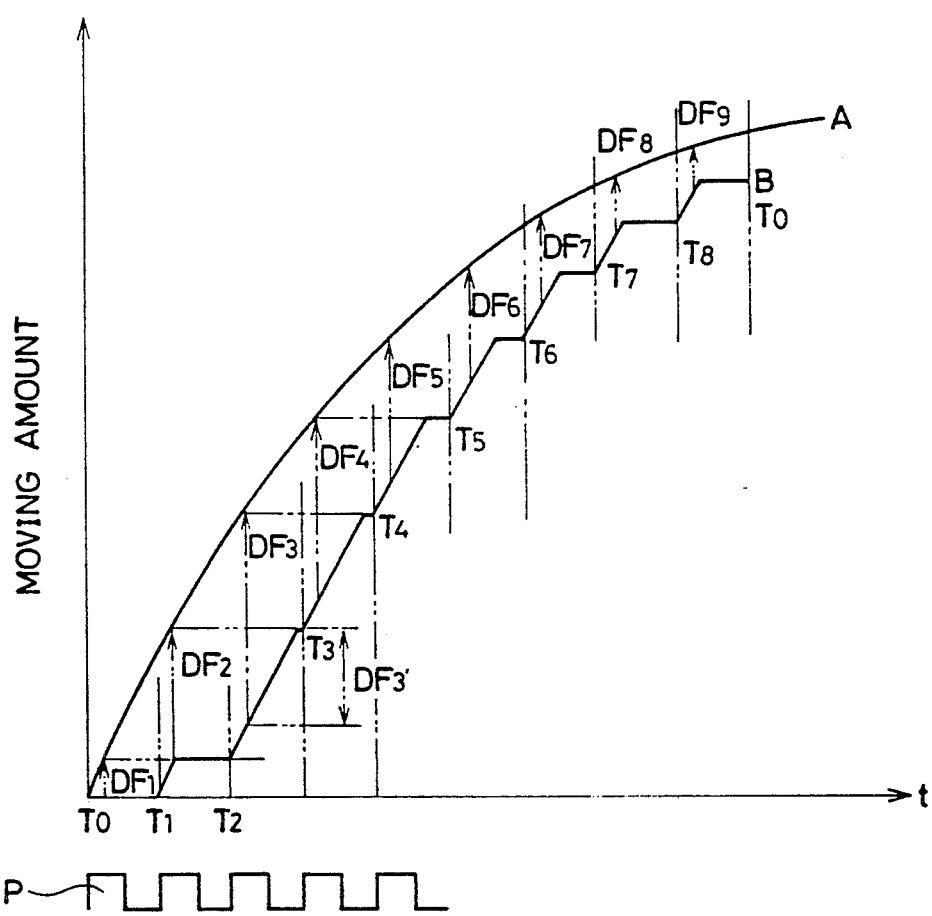
FIG. 1 is a graph showing a follow-up characteristic of a conventional compensator lens during a zooming operation, where actual delays in follow-up with respect to an ideal follow-up curve are shown.
Figure 2:
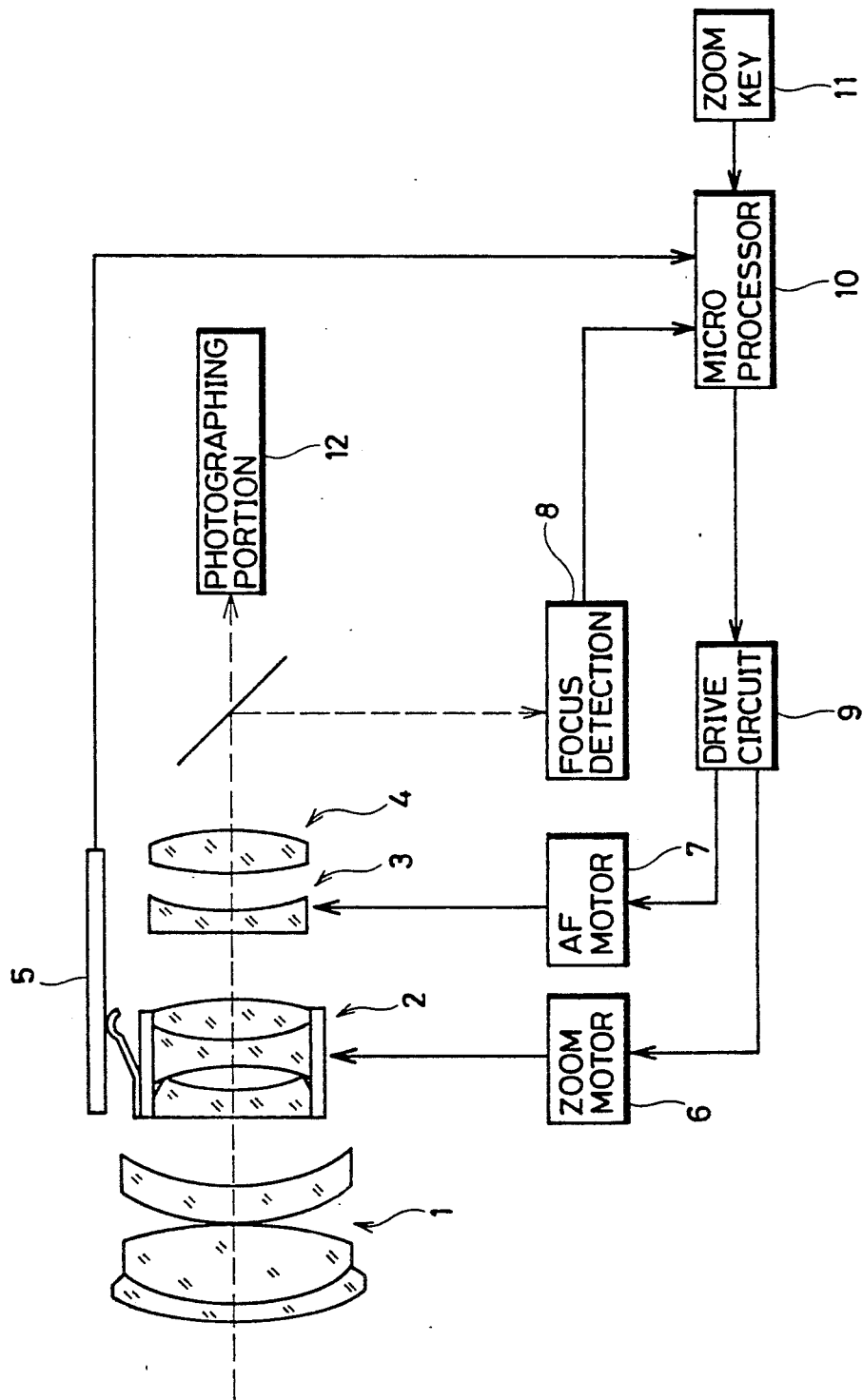
FIG. 2 is an illustration showing a main construction of an automatic focusing apparatus of a first embodiment of the present invention.

FIG. 2 is a diagram showing a main construction of an automatic focusing apparatus according to the first embodiment of the present invention. A zoom lens unit comprises lenses 1 to 4, including a variator lens 2 (hereinafter referred to as a variator) movable for varying focal length of the zoom lens unit and a compensator lens 3 (hereinafter referred to as a compensator) for focus adjustment, especially for compensating a deviation of a focal point of the zoom lens unit caused by a movement of the variator 2. A zoom encoder 5 for reading a position of the variator 2 is provided over the variator 2. The whole moving range of the variator 2 is divided into five focal length zones and the zoom encoder 5 detects the zone where the variator is located. A zoom motor 6 for driving the variator 2 and an auto focus (AF) motor 7 for driving the compensator 3 are connected to a drive circuit 9. A focus detecting portion 8 detects a focus condition by using light from an object, passing through the lenses 1 to 4. The zoom motor 6 and the AF motor 7 are driven through the drive circuit 9 in response to a signal from a microprocessor 10 which receives signals from the focus detecting portion 8, the zoom encoder 5 and a zoom key 11 operated for zooming as well as setting of the direction of the zooming. A photographing portion 12 includes a two-dimensional charge coupled device (CCD) image sensor.

Next, a construction of the focus detecting portion 8 will be described.

Figure 3:
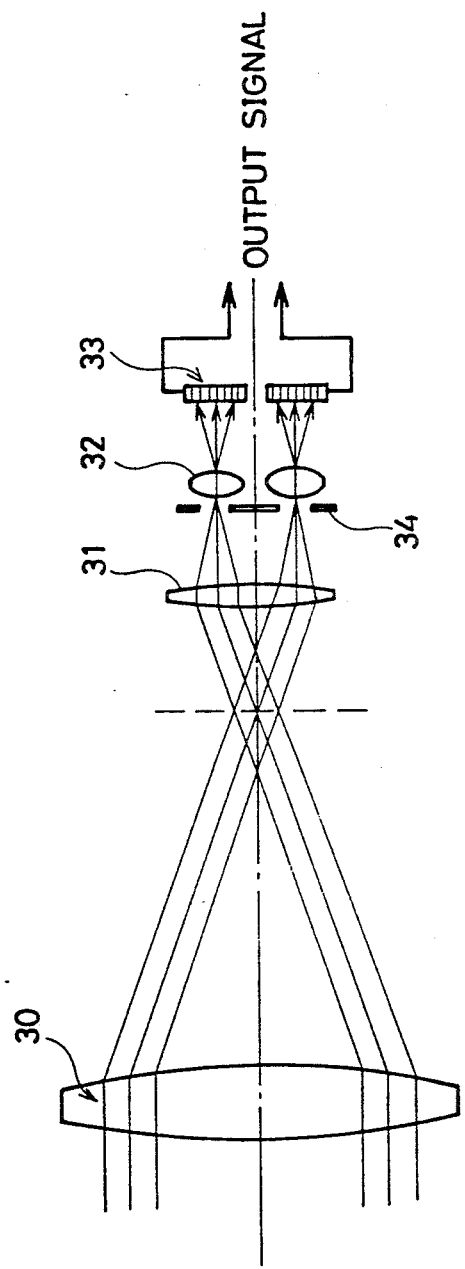
FIG. 3 is diagram showing a construction of a focus detecting portion according to the present invention, including an optical system.
Figure 4:
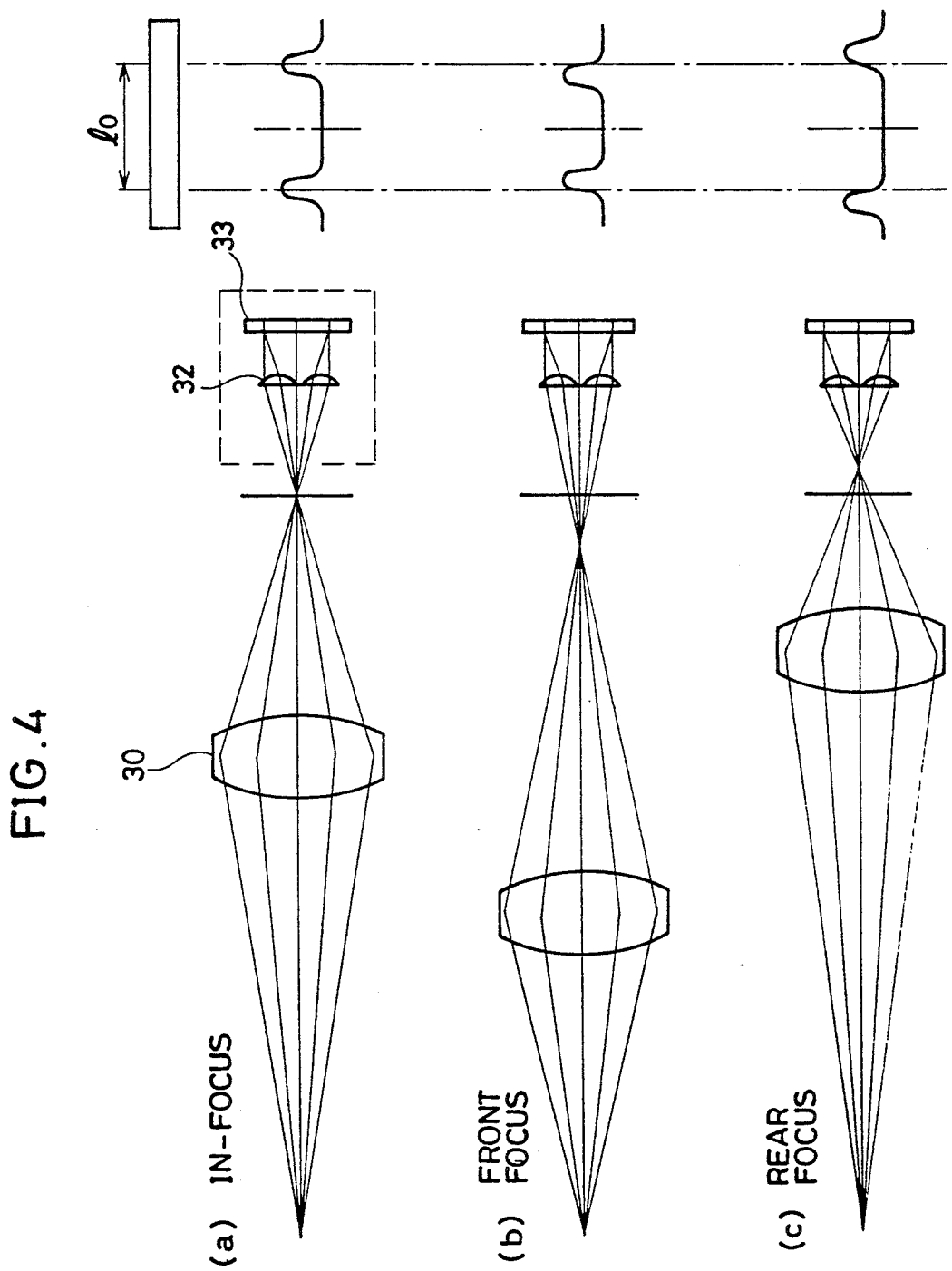
FIG. 4 is an illustration showing a principle of focus detection according to the present invention, where various focus conditions are represented.

FIG. 3 shows the construction of the focus detecting portion 8 including an optical system. FIG. 4 is an illustration for explaining focus conditions. Referring to FIGS. 3 and 4, the incident light passing through a taking lens 30 is divided into two beams by means of an aperture mask 34 through a relay lens 31 and those beams are reimaged on two regions, i.e., a basic region and a reference region set on a CCD line sensor 33, by means of a reimaging lens 32. As shown in FIG. 4, assuming that a distance between two images reimaged on the CCD line sensor 33 is l0 in an in-focus condition, the distance of the two images in a front focus condition is smaller than l0 and that in a rear focus condition is larger than l0. This distance of the images is substantially proportional to a defocus amount. Accordingly, if the distance of the images is detected, an in-focus condition or an out-of-focus condition can be determined and in the case of the out-of-focus condition, a defocus amount and a direction of defocus can be determined. Therefore, in order to perform focusing operation when zooming is not effected, the microprocessor 10 calculates the defocus amount based on information from the above mentioned focus detecting portion 8 as shown in FIG. 2 and the AF motor 7 is driven to move the compensator 3 by a distance corresponding to that amount.

A method for maintaining an in-focus condition during zooming will described in the following.

Figure 5:
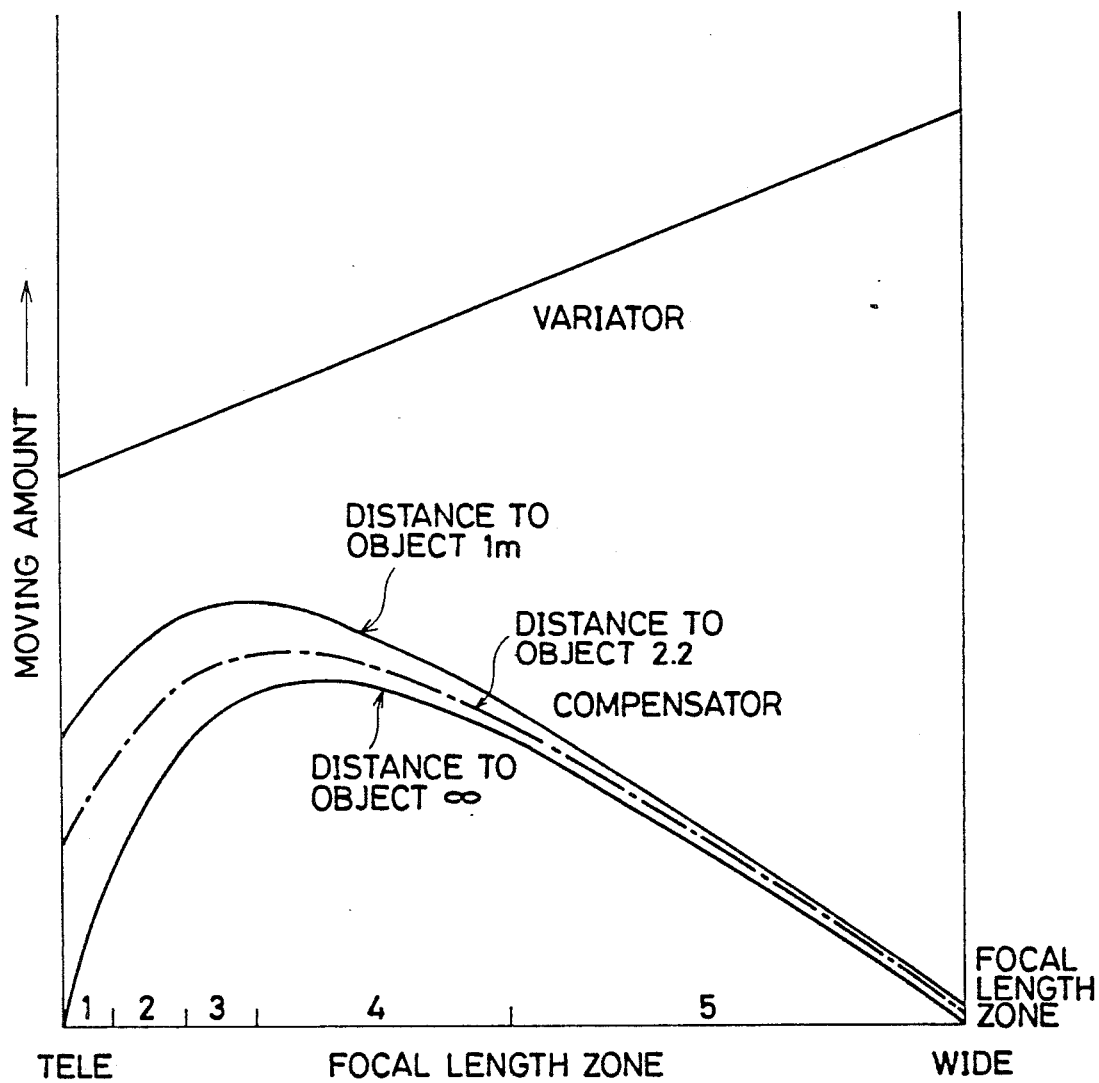
FIG. 5 shows a relation between a moving amount of a variator lens and that of a compensator lens in the first embodiment of the present invention.

FIG. 5 shows a relation between a moving amount of the variator 2 with respect to a focal length and a moving amount of the compensator 3 for maintaining constant a position of an image pickup plane or a focal point. As for a distance to an object, this diagram of FIG. 5 shows two cases, i.e., a distance of 1m and an infinite distance. Thus, if the compensator 3 can be driven to move corresponding to the curves in the diagram when the object is located at the above-mentioned distances, the in-focus condition can be maintained during zooming.

Figure 6:
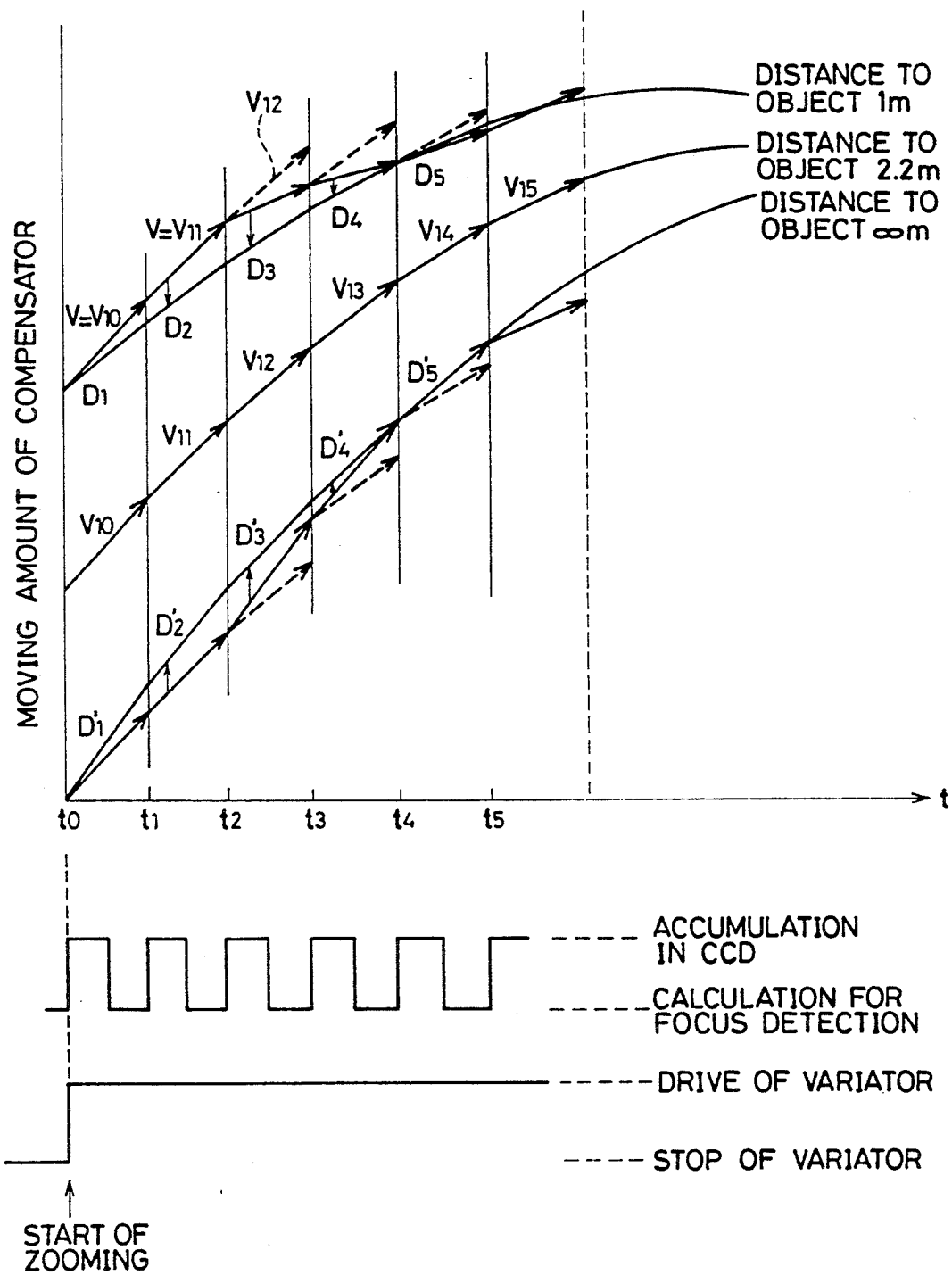
FIG. 6 shows a change of an actual moving amount of the compensator lens in relation to time compared with an ideal follow-up curve in the first embodiment of the present invention.

In FIG. 6, the curves represent ideal movements of the compensator 3 for maintaining the in-focus condition during zooming with respect to some distances to the object, while solid line arrows represent an example of a real movement of the compensator 3. If the solid arrow lines are within a range near the above mentioned curve, a practical in-focus condition can be maintained. Information necessary for driving the compensator 3 during zooming includes a focal length, a zooming direction, information of focus detection (i.e., a defocus amount) and the information of elapsed time related with focus detection cycles.

The focus detecting portion 8 accumulates charge in the CCD line sensor 33 dependent on an amount of received light (that is, integration in CCDs is performed) and the microprocessor 10 performs calculation for focus detection based on the result of the integration. Consequently, a little time is required after the zoom key is turned on (at the time $t=t0$ in FIG. 6) until information of focus detection is first obtained (at the time $t=t1$ in FIG. 6). If only the variator 2 is driven and the compensator 3 is stopped during this period, a considerably defocused image is obtained. Therefore, when the zoom key 11 is turned on (at the time $t=t0$ in FIG. 6), the variator 3 and the compensator 2 start to be driven simultaneously.

The moving speed of the compensator 3 at that time is a basic speed (predetermined for each focal length zone and each zooming direction) read from a ROM table of the microprocessor 10 based on information from the zoom encoder 5 (i.e., a focal length zone where the variator 2 is located) and information from the zone key 11 (i.e., a zooming direction) (this basic speed being referred to hereinafter as the initial basic speed). For example, if the variator 2 exists in the third zone (as shown in FIG. 5) during zooming in the wide direction (as defined above), a basic speed for the third zone in the wide direction (i.e., $+0.4188$ mm/sec) is read from the ROM table (as shown in Table 1) so as to be used as the moving speed of the compensator 3. If the variator 2 exists in the fifth zone, a basic speed for the fifth zone in the wide direction (i.e., $-0.38$ mm/sec) is read from the ROM table so as to be used as the moving speed of the compensator 3. The "+" sign for indication of the speed indicates a forward movement of the compensator 3.

Basic speed values will be described in the following. It is assumed that zooming is effected with respect to an object located at a distance (e.g., 2.2 m) at which a moving amount of the compensator 3 corresponds to an intermediate value between moving amounts of the compensator 3 at a minimum photographing distance (e.g., 1 m) and at an infinite photographing distance. On that assumption, an ideal speed of the compensator 3 for maintaining an ideal in-focus condition is regarded as a basic speed ($V_{10}$, $V_{11}$, $V_{12}$ etc. in FIG. 6). Further, a basic speed at a change point of respective focal length zones is regarded as an initial basic speed of the compensator ($V_{10}$, $V_{20}$, $V_{30}$, etc. in FIG. 8) in the zooming direction for each focal length zone to be started. Two basic speeds, i.e., for zooming in the tele direction and for zooming in the wide direction (as defined above) are set for each focal length zone. Consequently, ten initial basic speeds in total are set for all the focal length zones (as shown in Table 1). The "+" or "−" sign of the initial basic speed of the compensator 3 (i.e., the moving direction of the compensator 3) and the absolute values thereof are changed according to the zooming direction dependent on the focal length zones. This is because the basic speeds toward the tele end and toward the wide end are different even in the same focal length zone.

TABLE 1

| | Initial Basic Speed (mm/sec) | | | | |
|---|---|---|---|---|---|
| | zone | | | | |
| direction | 1 | 2 | 3 | 4 | 5 |
| wide | 1.484 | 0.914 | 0.418 | 0.086 | −0.328 |
| tele | −1.070 | −0.500 | −0.155 | 0.311 | 0.362 |

TABLE 2

| | Speed Change Rate (Acceleration Rate) (mm/sec²) | | | | |
|---|---|---|---|---|---|
| | zone | | | | |
| direction | 1 | 2 | 3 | 4 | 5 |
| wide | −1.213 | −0.809 | −0.539 | −0.270 | −0.009 |
| tele | 1.213 | 0.809 | 0.539 | 0.270 | 0.009 |

TABLE 3

| | Defocus Compensation Amount (mm/sec · μm) | | | | |
|---|---|---|---|---|---|
| | zone | | | | |
| direction | 1 | 2 | 3 | 4 | 5 |
| wide | 0.012 | 0.012 | 0.012 | 0.008 | 0.008 |
| tele | 0.011 | 0.011 | 0.011 | 0.008 | 0.008 |

Figure 8:
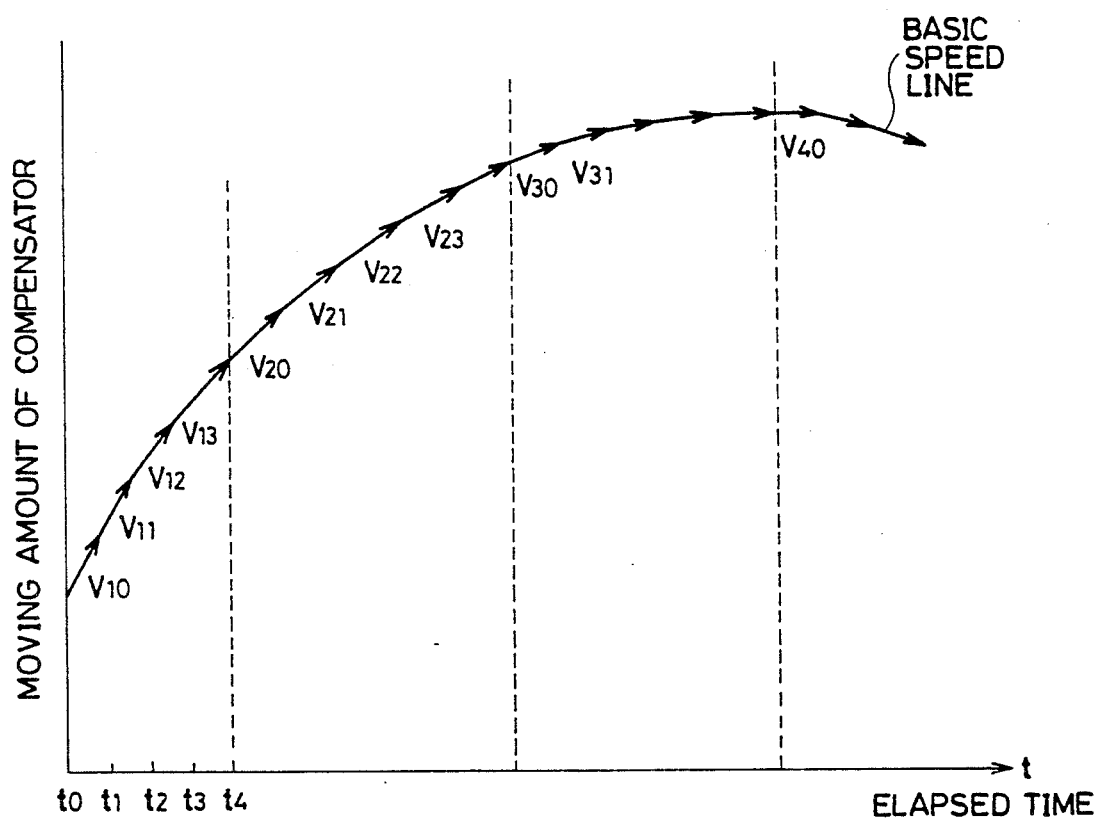
FIG. 8 is a graph for explaining a change in a basic speed for the compensator lens according to the first embodiment of the invention.

Next, in order to make the compensator follow the ideal curves of the compensator moving amount (as shown in FIG. 5), the basic speed is also gradually changed according to the elapsed time in the respective zones. For example, as shown in FIG. 8, the basic speed line is caused to have a change characteristic depend on the time so that the basic speed line may correspond to an ideal follow-up curve at a photographing distance substantially (e.g., a curve of a photographing distance 2.2 m) whereby zooming can be always effected in an in-focus condition at that specified distance. Assuming that the basic speed for moving the compensator 3 is Vn, that the initial basic speed in the zone is V0, and that the speed change rate (acceleration) is α, the gradually changed basic speed is represented as follows:

$$V_n = V_0 + \alpha \cdot (t_n - t_{n-1}) [mm/sec] \quad (1)$$

In this equation, the value of $(t_n - t_{n-1})$ corresponds to a focus detection cycle and it is measured for example by the above mentioned microprocessor 10 as shown in FIG. 2. The values of V0 and α are called from the ROM table which stores the values of Table 1 and Table 2.

If the compensator 3 is moved at the above mentioned basic speed simultaneously with zooming, the zooming can be effected with an in-focus condition being maintained at the photographing distance of about 2.2 m. However, as is understood from FIG. 5, the curves of the moving amount of the compensator 3 differ at other photographing distances and accordingly the in-focus condition could not be maintained. Therefore, an out-of-focus condition, i.e., a defocus amount is detected by the above described focus detecting portion 8, so that the defocus amount is used for correcting the moving speed of the compensator 3. For example, assuming that an actual moving speed of the compensator 3 is V, that the detected defocus amount is D [μm], and that a coefficient for obtaining a speed correction amount from the detected defocus amount is k, the compensator 3 is moved at the moving speed represented by $$V = Vn + k \cdot D [mm/sec] \quad (2)$$

where Vn is the above mentioned basic speed. The coefficient k is called from the ROM table which stores the values of Table 3. The value of k·D becomes a plus or minus value dependent on the value of the defocus amount D, making it possible to increase or decrease the speed.

More specifically, if the compensator 3 continues to be moved only by the basic speed Vn, deviation from the in-focus condition may occur. Consequently, when it becomes possible to obtain a result of focus detection after the start of zooming, the moving speed of the compensator 3 is controlled based on the zooming direction, the focal length zone, the information of elapsed time related with the focus detection cycles, and the information of focus detection (the defocus amount), so that the in-focus condition can be maintained. Taking as an example a case of zooming of the first zone in the wide direction from the tele end, description will be made of speed control of the compensator 3 with reference to FIG. 6 and the flow charts of FIGS. 7A and 7B. In this example, the distance to the object is assumed to be 1 m. In FIG. 6, t0 represents time at the start of zooming; $V_{10}$, $V_{11}$, $V_{12}$ etc. represent basic speeds; the curve at the distance of 1m to object represents an ideal moving characteristic of the compensator 3; the dotted line arrows represent driving at the basic speeds; the solid line arrows represent driving at actual driving speeds. In addition, $D_1$, $D_2$, $D_3$ etc. represent defocus amounts detected at the time of driving the compensator 3 along the solid line arrows and the arrows (vertical direction) represent the defocus detecting directions. The shown positions of $D_1$, $D_2$, $D_3$ etc. correspond to the times when accumulation of charge in the CCDs is performed, as seen from the timing chart in the lower portion of FIG. 6, in which one cycle of focus detection calculation is terminated at each of the times t=t1, t2, t3 etc., with the defocus amount D1, D2, D3 etc. being detected at the times t1, t2, t3 etc. More specifically, the defocus amounts $D_1$, $D_2$, $D_3$ etc. are defocus amounts at a moment corresponding to a central point of each accumulation time in the CCDs.

In operation, the states of the zoom key and the zoom encoder are first of all read in step S0 and it is determined in step S1 whether the zoom key is turned on or not. If the zoom key is not on, the processing flow proceeds to a normal auto focus mode (AF mode) from step S1 and it is determined in step S2 whether zooming is effected or not. If zooming is effected, the variator 2 and the compensator 3 are stopped in step S3 and the processing flow proceeds to step S4. If zooming is not effected, the processing flow skips step S3 and proceeds to step S4. The normal AF mode is set before the zooming to be started by pressing the zoom key, and the steps S0, S1, S2 and S4 are executed, so that focus detection in the normal AF mode is effected. After that, it is determined in step S5 whether an in-focus condition is set or not. If it is determinated that the in-focus condition is not set, the flow proceeds to step S6 to drive the compensator 3 according to the defocus amount detected in step S4 and then it returns to step S0. If it is determinated that the in-focus condition is set, the flow skips step S6 and returns to step S0.

After that, when the zoom key is pressed, the ON signal of the zoom key and the state of the zoom encoder are read in step S0 and, based on determination in step S1, the processing flow proceeds to a zoom AF mode so that zoom control as shown in FIG. 6 is effected. It is assumed that the variator 2 is at the tele end and that the first zone is selected. The position of the variator 2 is determined based on the data of the zoom encoder read in step S0. In the zoom AF mode, it is first determined in step S7 whether the focus detection cycle is the first cycle or not. If it is the first cycle, the processing flow proceeds to step S8 to set the initial basic speed $V_{10}$ and, in step S9, the variator 2 and the compensator 3 start simultaneously to be driven. Thus, zooming is started (at the time t=t0). At the same time, in step S10, charge accumulation in the CCDs for focus detection is started. The initial basic speed $V_{10}$ set at the time t=t0 is 1.484 mm/sec selected from Table 1. In step S10, focus detection, i.e., accumulating operation in the CCD line sensor and defocus calculation using the data obtained by the accumulating operation are carried out in a period until the time t=t1 at the start of the next focus detection cycle, and the compensator driving speed is changed according to the equations (1) and (2) at the time t=t1. Thus, after the focus detection operation in step S10, reliability of the result of focus detection is determined in step S11. If it is determined that focus detection is unavailable, a flag LCF indicating unavailable focus detection is set to 1 in step S12 and the processing flow proceeds to determination in step S14. The unavailable focus detection signifies cases such as the case in which characteristics of object data cannot be extracted because of a low contrast value of the object or the case in which data with high reliability cannot be obtained because of an inferior S/N ratio of object data due to low luminance and so on. In the following, operation will be described on the assumption that focus detection is available in the present cycle. It is determined in step S11 that focus detection is available, and, in step S13, the flag LCF indicating unavailable focus detection is reset to 0, and then the flow proceeds to determination in step S14. In step S14, it is determined whether the zooming direction is changed or not. If the zooming direction is not changed, determination in step S15 is effected. In step S15, it is determined whether the focal length zone is changed or not. If the same first zone as in the previous cycle is selected, it is determined that the focal length zone is not changed and, in step S16, the basic speed $V_{11}$ in the present cycle is calculated according to the equation (1). Assuming that the focus detection cycle $(tn - tn_{-1})$ is a constant value 50 msec, the basic speed V11 is as follows.

$$\begin{aligned} V_{11} &= V_{10} + a \cdot (t1 - t0) \\ &= 1.484 + (-1.213) \times 0.05 \\ &= 1.423 \text{ mm/sec} \end{aligned}$$

Then, speed correction according to the defocus amount $D_1$ based on the equation (2) is effected. In the speed correction, the state of the flag LCF indicating unavailable focus detection is determined at first in step S21. Since the flag LCF is 0, the processing flow proceeds to step S22, so that the moving speed V in this cycle is calculated in the following manner.

$$V = V_{11} + k \cdot D$$

In step S24, the compensator 3 is driven at the moving speed V in this cycle and the processing flow returns to step S0.

As shown in FIG. 6, the first defocus amount $D_1$ detected at the time t=t1 is substantially 0 and therefore this defocus amount can be disregarded. Thus, the moving speed in this cycle is $V = V_{11} = 1.423$ mm/sec and the compensator 3 is driven at the basic speed V11 in step S24. This means that the moving speed of the compensator 3 may be the basic speed because there is little defocus amount detected, that is, there is little deviation of the focus although there is a small difference in the speeds at the time of the first cycle of focus detection.

Then, the processing flow proceeds to determination in step S7 through steps S0 and S1. Since this cycle of focus detection is the second cycle, the processing flow skips steps S8 and S9 and proceeds to step S10 to effect focus detection in the second cycle. After the focus detection is terminated at the time t=t2, the processing flow proceeds to steps S11, S13, S14 and S15 in the same manner as in the previous cycle and the basic speed in this cycle is calculated in step S16 in the following manner.

$$V_{12} = V_{11} + (-1.213) \times 0.05 = 1.326 \ mm/sec$$

Then, the processing flow proceeds to step S22 from step S21, so that the moving speed V in this cycle is calculated. Assuming that the defocus amount D2 detected at the time t=t2 is $-50$ μm, the moving speed V in this cycle is as follows.

$$\begin{aligned} V &= V_{12} + k \cdot D \\ &= 1.362 + 0.012 \times (-50) \\ &= 0.762 \ mm/sec \end{aligned}$$

Thus, in step S24, the compensator 3 is driven at the moving speed V (as shown by the solid line arrow in FIG. 6) slower than the basic speed $V_{12}$ shown by the dotted line arrow in FIG. 6 and the moving speed of the compensator 3 is changed to approach the in-focus line.

Then, steps S0, S1, S7 and S10 are executed and focus detection in the third cycle is effected until the time t=t3. In this case, in the same manner as in the second cycle, the basic speed V13 is calculated at first in step S16 in the following manner.

$$V_{13} V_{12} + (-1.213) \times 0.05 = 1.301 \ mm/sec$$

Assuming that the defocus amount $D_3$ detected at the time t=t3 is $-60$ μm, the moving speed of the compensator 3 in this cycle is obtained in step S22 in the following manner.

$$\begin{aligned} V &= V_{13} + k \cdot D \\ &= 1,301 + 0.012 \times (-60) \\ &= 0.581 \ mm/sec \end{aligned}$$

In step S24, the moving speed V of the compensator 3 is changed so that the compensator 3 is driven as shown by the solid line arrow at the time t=t3. Then, the fourth focus detection is terminated at the time t=t4 and after the basic speed $V_{14}$ (=1.240 mm/sec) is obtained in the same manner, the moving speed V (=1.000 mm/sec) in this cycle is obtained based on the defocus amount $D_4 = -20$ μm detected at the time t=t4, so that the compensator 3 is driven as shown by the solid line arrow. Subsequently, in the same manner, the basic speed $V_{15}$ (=1.179 mm/sec) is calculated at the time t=t5 and the present moving speed $V = V_{15} + k \cdot D$ is obtained. Since the defocus amount $D_5$ detected at the time t=t5 is substantially 0, the compensator 3 is driven at the basic speed. The zooming in the same zone is controlled in the above described manner and the constants in Tables 1 to 3 are set so that the above mentioned detected defocus amounts $D_1$, $D_2$, $D_3$, $D_4$, $D_5$ may be within a depth of focus defined by an aperture F value, a focal length of the lens and so on. As a result, the zooming can be effected with the in-focus condition being maintained.

Figure 7A:
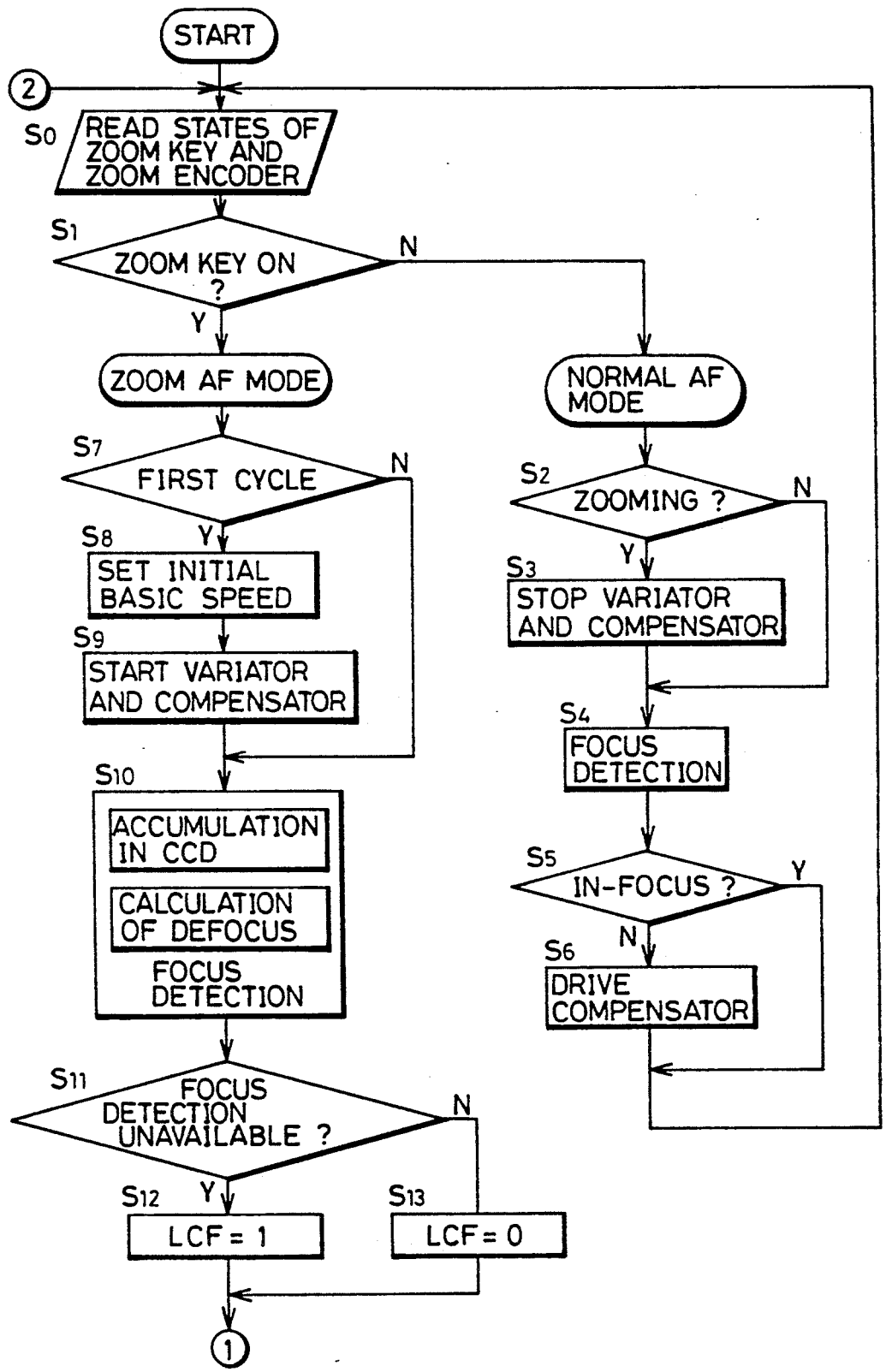
FIGS. 7A and 7B show flow charts of entire processing in the first embodiment of the present invention.
Figure 7B:
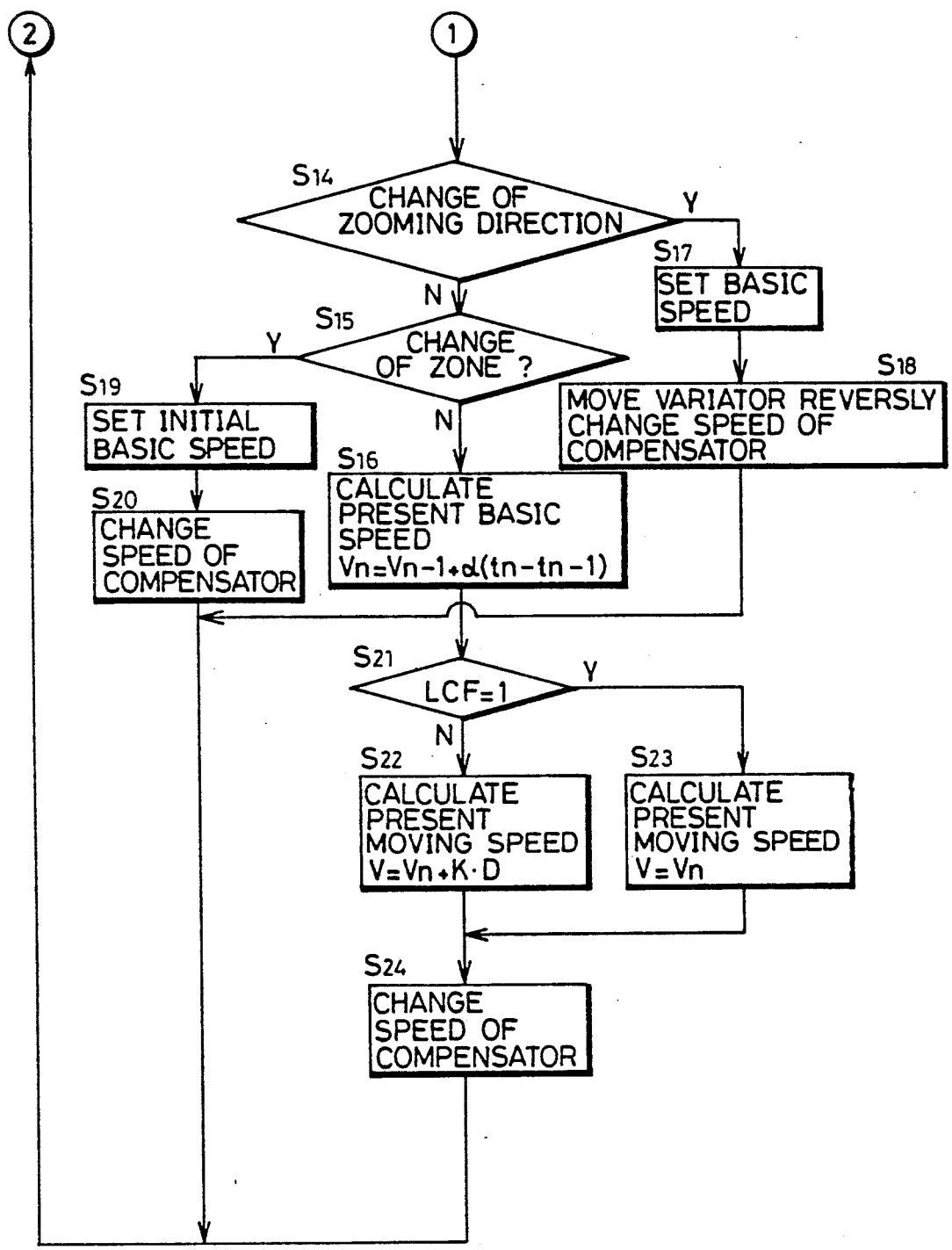

Then, if the focal length zone is changed after the time t=t5, the zone change is determined in step S15 in FIG. 7B and the processing flow proceeds to step S19. The initial basic speed $V_{20}$ of the new zone (the second zone in this case) is set and the moving speed of the compensator 3 is changed in step S20, so that the processing starting with step S0 is repeated. Subsequently, the zooming is controlled in the same manner. On the other hand, if the zooming direction is changed in step S14, the processing flow proceeds to step S17 to set the basic speed according to the zooming direction and the focal length zone. Then, in step S18, the moving direction of the variator 2 is reversed, and the moving speed of the compensator 3 is changed.

If zooming is effected during photographing of an object of a low contrast value or of an object under a low luminance condition, focus detection may become unavailable halfway through zooming or the zooming may be effected in the unavailable focus detection condition from the beginning. In such a case, it is determined in step S21 in FIG. 7B that focus detection is unavailable and the processing flow proceeds to step S23 so that the compensator 3 is driven at the basic speed Vn. Since the above mentioned conditions of the object occur mostly in the case of photographing in a room, the basic speed line as shown in FIG. 8 is set for example to a distance enabling photographing in good condition (e.g., a distance of 3 to 5 m) and, thus, an excessive defocus can be avoided in such a case.

The above description was related with cases of zooming with respect to an object at a relatively short distance. However, zooming can be controlled in the same manner with respect to an object at a relatively long distance. More specifically, referring to FIG. 6, zooming control with respect to an object at an infinite distance ∞ is also illustrated. Compared with the case of a distance of 1 m, the defocus amounts $D_1'$, $D_2'$, $D_3'$ etc. are detected at respective focus detection cycles t1, t2, t3 etc. in the direction opposite to that in the case of the distance of 1 m since the basic speed is set generally to change in a gradual manner with respect to an ideal moving characteristic of the compensator 3. As a consequence, the moving speed of the compensator 3 is corrected to relatively fast speed on the whole. This is because the sign of the defocus amount D (the defocus direction) is "+" as a result of the calculation in step S22 in FIG. 7B.

Figure 9A:
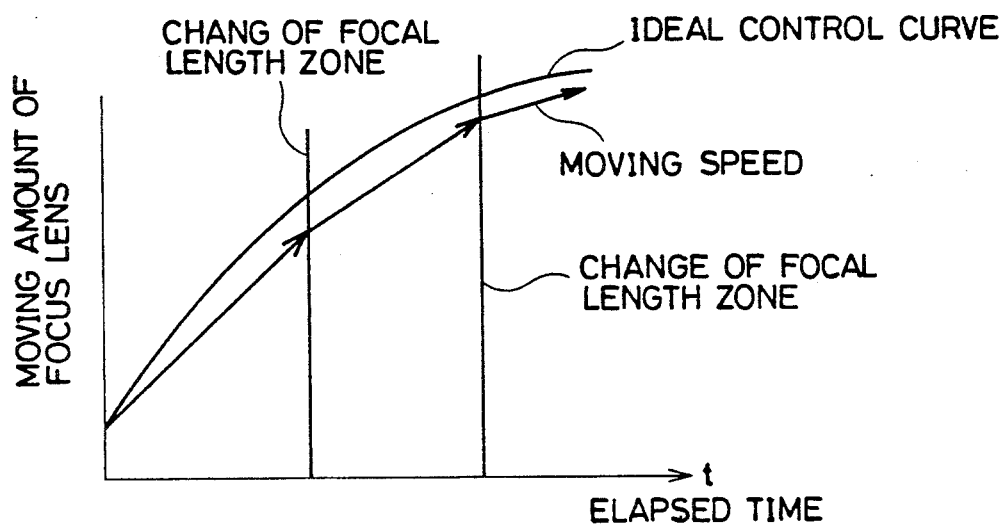
FIG. 9A is a graph for explaining operation of a compensator (focus) lens of an conventional example for comparison with the first embodiment of the invention.

In an example shown in FIG. 9A to be compared with the present invention, the moving speed of the compensator (focus lens) is not changed based on information of elapsed time related with the focus detection cycle and accordingly the moving speed deviates considerably from an ideal follow-up (control) curve. Since all the errors thus caused need to be corrected based on result of focus detection, the processing depends considerably on the information of focus detection.

Figure 9B:
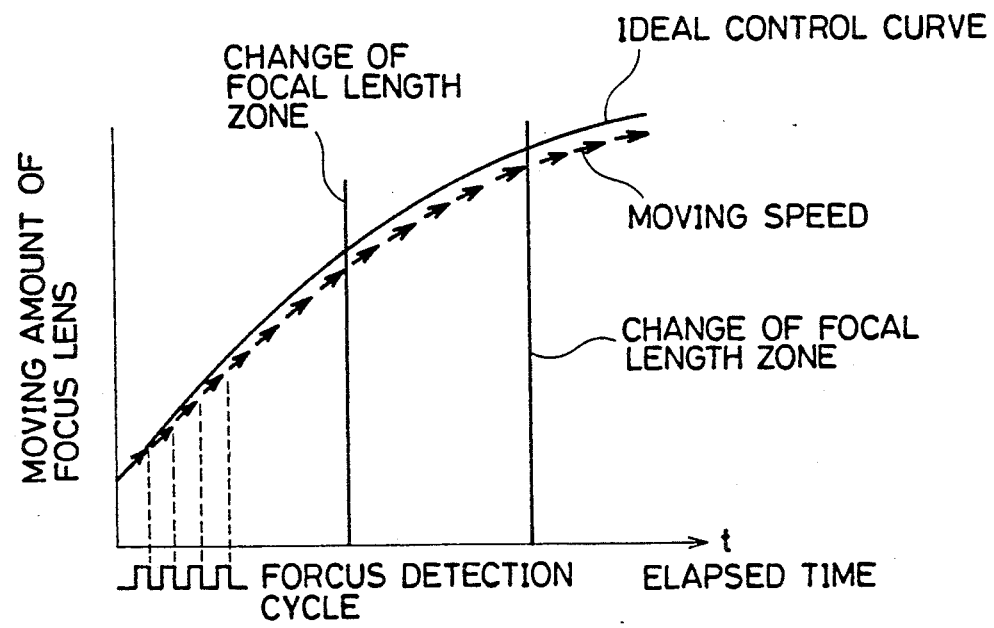
FIG. 9B is a graph for explaining operation of a compensator (focus) lens according to the first embodiment of the invention.

On the other hand, according to the present invention, as shown in an example of FIG. 9B, the moving speed of the compensator (focus lens) is gradually changed based on information of elapsed time related with focus detection cycles. Consequently, the moving speeds can be changed following an ideal follow-up (control) curve as if a plurality of moving speeds are stored for one focal length zone. Accordingly, a correction amount of the moving speed based on the result of focus detection can be reduced to a small value and a stable speed control can be carried out even if the result of focus detection has a low reliability.

In the above described manner, zooming can be carried out with the in-focus condition being maintained independent of a distance to an object. Referring to FIG. 7A, steps S2 and S3 are steps for temporarily stopping zooming operation before a change from the zoom AF mode to the normal AF mode. At the time of setting the initial basic speed in step S8 in the first cycle of the zoom AF mode, the tele end/wide end or the zone change point is not always selected and it is sometimes preferable not to set the initial basic speed. In such a case, the below described procedure for example may be executed. The basic speed at that time of terminating the previous zooming is stored and when the next zooming is to be started, the basic speed is read from the memory so as to be used in step S9. In addition, calculation of the focus detection cycle $(t_n - t_{n-1})$ etc. may be performed by using a timer incorporated in the microprocessor 10 for measuring time, or the calculation according to the equation (1) may be simplified by making the focus detection cycle $(t_n - t_{n-1})$ always constant. In the latter case, the two ROM tables of Table 1 and Table 2 can be simplified as one ROM table.

According to the above described method of successively changing the basic speed in the same focal length zone, the ideal follow-up curves of the compensator dependent on the difference of the distances to the object have a similar correspondence as shown in FIG. 5 and accordingly it is possible to reduce the change of the speed (e.g., the value of the coefficient k in the equation (2)) based on the result of focus detection, except for the case of the first and second zones. Thus, by setting a necessary minimum value for each zone, it is possible to prevent any abrupt change of the moving speed of the compensator 3 and to avoid unstable operation even if detected defocus amounts differ considerably.

Further, according to the focus detection system of a phase difference detection type as in this embodiment, a correlation coefficient representing degree of coincidence of output data from the two CCDs (as shown in FIG. 3) is obtained generally in order to determine the reliability of the detected defocus amount (as described in detail in Japanese Patent Laying-Open No. 60-4914). Therefore, the value of the coefficient k in the equation (2) may be set not only for each of the focal length zones as in Table 3 but also it may have a plurality of values dependent on the above mentioned correlation coefficient even in the same focal length zone. Thus, since the defocus amount D with a high correlation coefficient (with good correspondence of the output data from the two CCDs) has a high reliability, the coefficient k for speed correction is made large. Conversely, since the defocus amount D with a low correlation coefficient (with insufficient coincidence of the data from the two CCDs) has a low reliability, the coefficient k is made small. Thus, zooming control can be prevented from being unstable due to the data of the defocus amount of a low reliability.

According to a second embodiment of the present invention for stably effecting zooming control, a plurality of basic speed lines according to distances to an object are provided, making it possible to further reduce the change of the moving speed dependent on the defocus amount (i.e., to further decrease the value of the coefficient k). For example, basic speed lines for long and short distances are provided and the first basic speed line is used for the long distance and the second basic speed line is used for the short distance.

Figure 10:
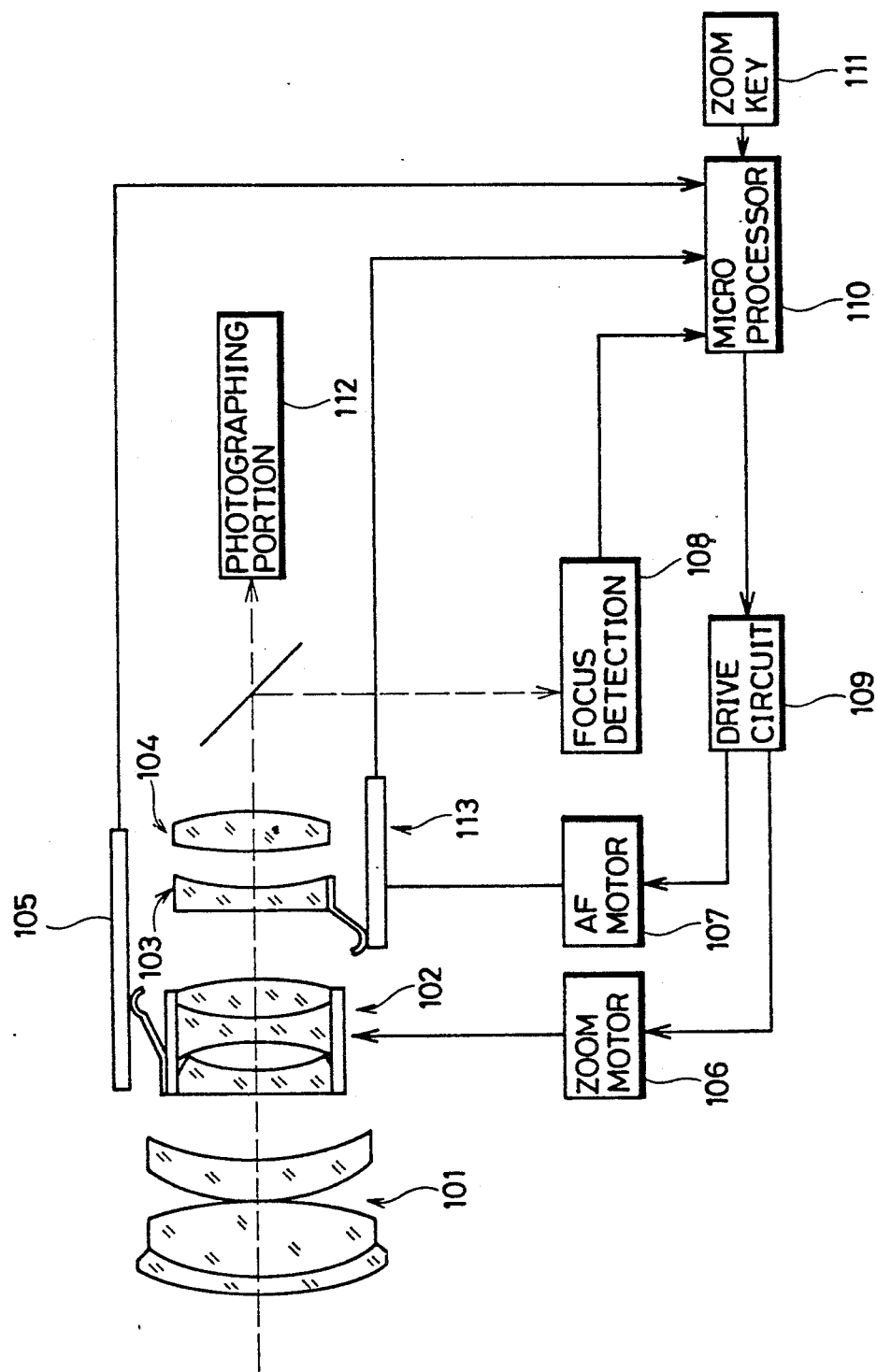
FIG. 10 is a diagram showing an entire construction of an automatic focusing apparatus according to a second embodiment of the present invention.

This second embodiment will be described in detail with reference to FIGS. 10 to 12A and 12B. An entire construction of an automatic focusing apparatus according to this second embodiment is as shown in FIG. 10. The apparatus shown in FIG. 10 and that shown in FIG. 2 are different in that the apparatus shown in FIG. 10 comprises a focus encoder 113 which reads the position of a compensator lens 103. According to this embodiment, the entire moving range of the compensator lens 103 is divided into three zones (the zones I to III) and detection is made as to in which zone the compensator lens 103 is located.

Figure 11:
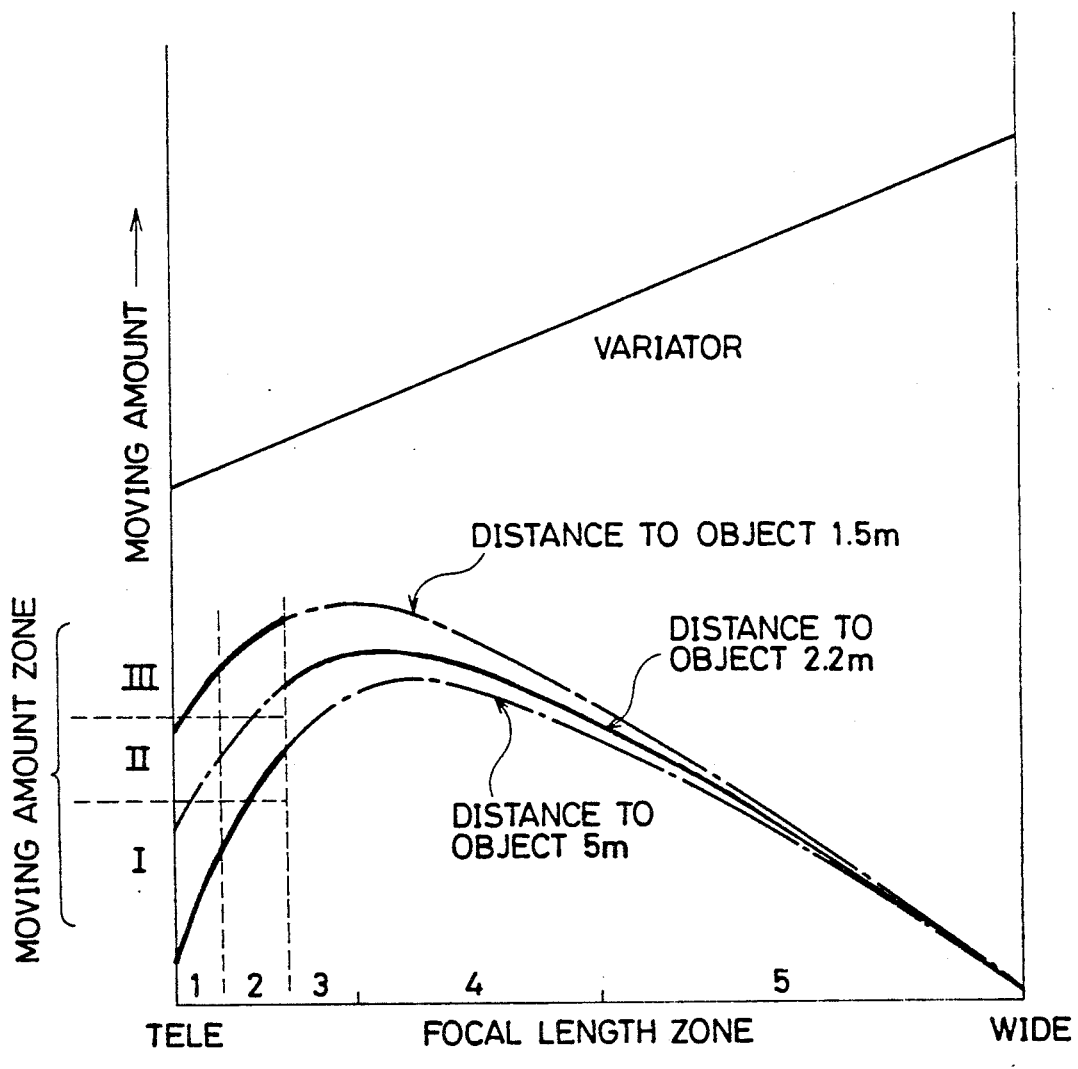
FIG. 11 is a graph showing a basic speed line of a compensator according to the second embodiment of the invention.

FIG. 11 shows basic speed lines used in this embodiment. In the first and second zones of the focal length range, two basic speed lines follow the ideal moving curve of the compensator lens 103 with a distance of 1.5 m to an object and the ideal moving curve thereof with a distance of 5 m to an object. In the third to fifth focal length zones, a basic speed line following the inclination of the ideal moving curve of the compensator lens 103 with a distance of 2.2 m to an object is used in the same manner as in the first embodiment. The reason for controlling the moving speed of the compensator lens 103 with the two basic speed lines only in the first and second zones is that there is little difference of inclinations of the ideal moving curves of the compensator lens 103 caused by the difference of the distances to the object in the third to fifth focal length zones as is understood from FIG. 11 or FIG. 5. The moving range of the compensator lens 103 is divided into the zones I and II with the moving amount of the compensator lens 103 with the distance of 2.2 m being regarded as a boundary in an intermediate point of the first focal length zone. Similarly, the moving range of the compensator lens 103 is divided into the zones II and III with the moving amount of the compensator lens 103 with the distance of 2.2 m being regarded as a boundary in an intermediate point of the second focal length zone. Accordingly, compared with the first embodiment in which the moving speed of the compensator lens 3 is controlled with the single basic speed line following the ideal moving curve of the compensator lens 3 with the distance of 2.2 m, the moving speed of the compensator lens 103 according to the second embodiment can be made more approximate to the ideal speed in all the focal length zones.

Figure 12A:
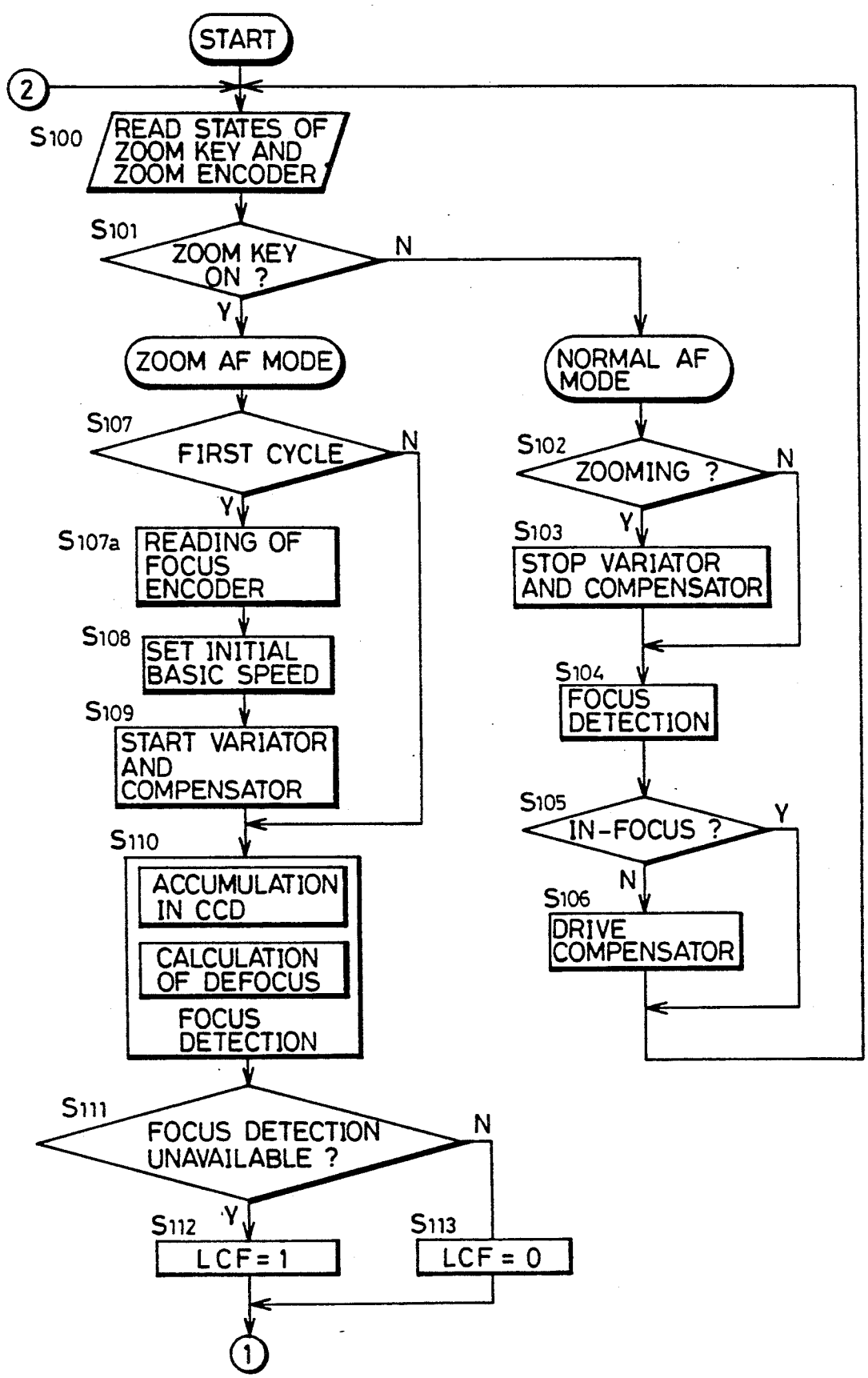
FIGS. 12A and 12B are flow charts of entire processing in the second embodiment of the invention.
Figure 12B:
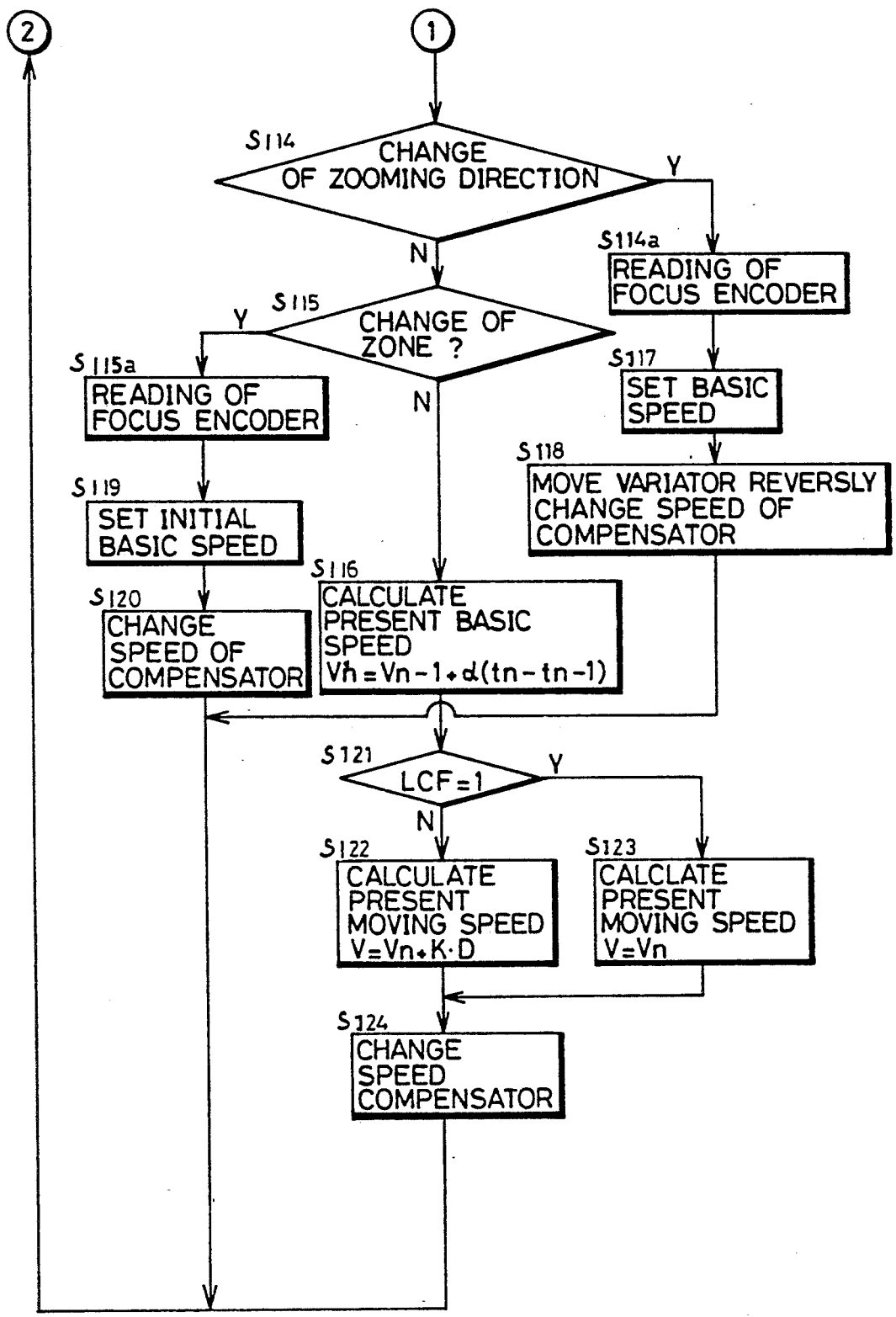

FIGS. 12A and 12B are flow charts showing operation of the second embodiment, which are in principle the same as the flow charts in FIGS. 7A and 7B according to the first embodiment. The difference resides in that the value of the focus encoder is read in steps S107a, S114a and S115a before the setting of the initial basic speed in steps S108, S117 and S119, respectively, whereby the initial basic speeds are set according to the read values.

Let us now assume that the focal length zone is determined to be the first zone as a result of the reading of the zoom encoder. In this case, if the moving amount of the compensator lens 103 is determined to be in the zone I as a result of the reading of the value of the focus encoder in steps S107a, S114a, S115a, the initial basic speed is set to a value following the ideal moving curve in the case of the distance of 5 m to the object. If the moving amount of the compensator lens 103 is determined to be in the zone II or III, the initial basic speed is set to a value following the ideal moving curve in the case of the distance of 1.5 m to the object. In the case of the focal length zone being the second zone, if the moving amount of the compensator lens 103 is in the zone III, the initial basic speed is set to a value following the ideal moving curve corresponding to the distance of 1.5 m and if the moving amount of the compensator lens 103 is in the zone I or II, the initial basic speed is set to a value following the ideal moving curve corresponding to the distance of 5 m. In the case of the focal length zone being the third to fifth zone, the initial basic speed is set to a value following the ideal moving curve corresponding to the distance of 2.2 m in the same manner as in the first embodiment.

The basic speed lines are not limited to the two lines and a plurality of basic speed lines can be provided over the entire focal length range. In addition, the value of the zoom encoder may be read immediately before the reading of the focus encoder in the flow charts in FIGS. 12A and 12B and thus finer control can be effected.

In addition, a color temperature detecting device of automatic white balance of a video camera may be used to determine whether light source is artificial light (a room light) or sunlight, so as to select a basic speed line on the short distance side in the case of artificial light and a basic speed line on the long distance side in the case of sunlight. Furthermore, in a method for determining whether light source is artificial light or sunlight to select the long distance side or the short distance side, an automatic exposure control circuit may be used instead of using automatic white balance, so as to detect a pulsating component (50 Hz or 60 Hz) contained in the artificial light.

Figure 13A:
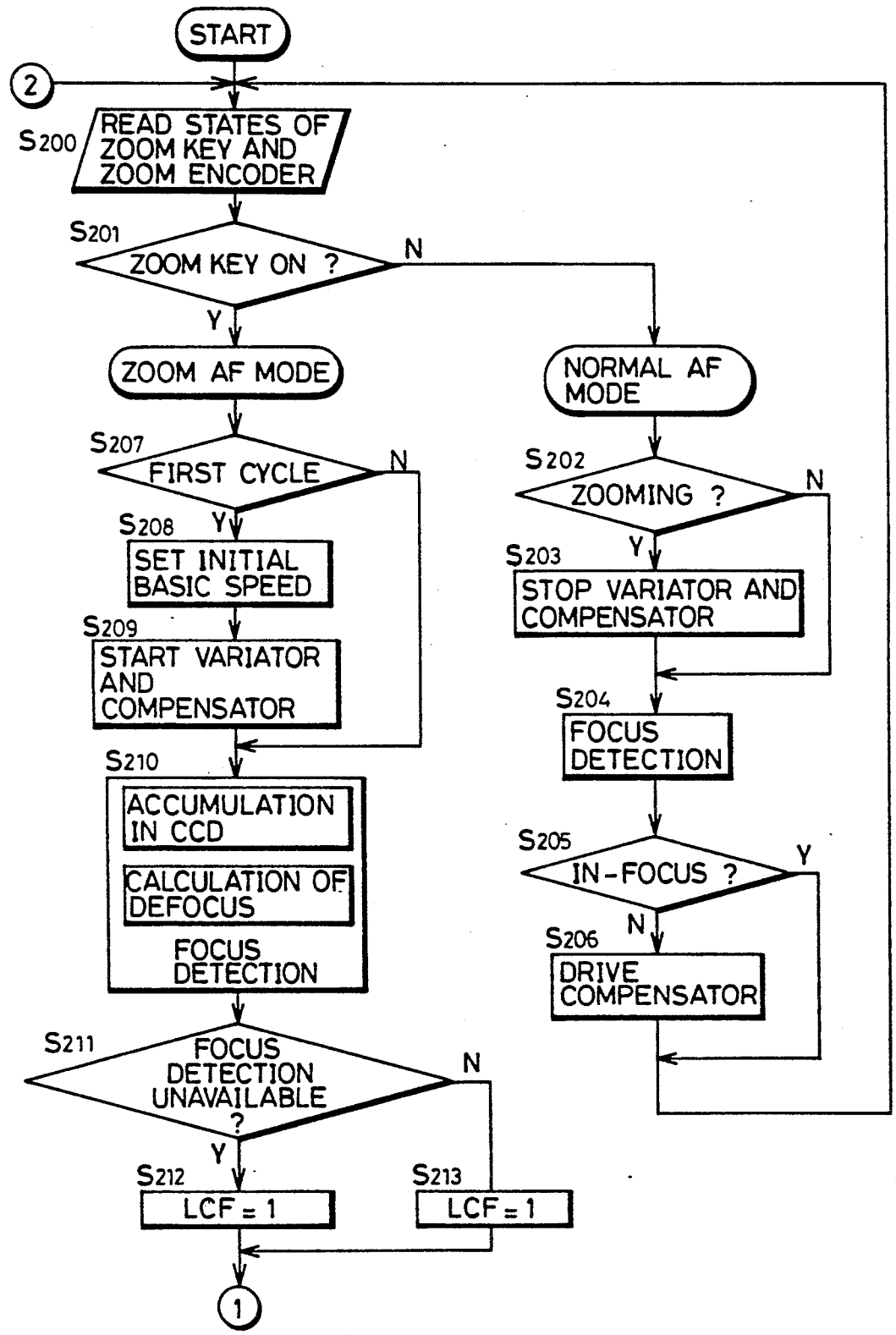
FIGS. 13A and 13B are flow charts of entire processing in a third embodiment of the invention.
Figure 13B:
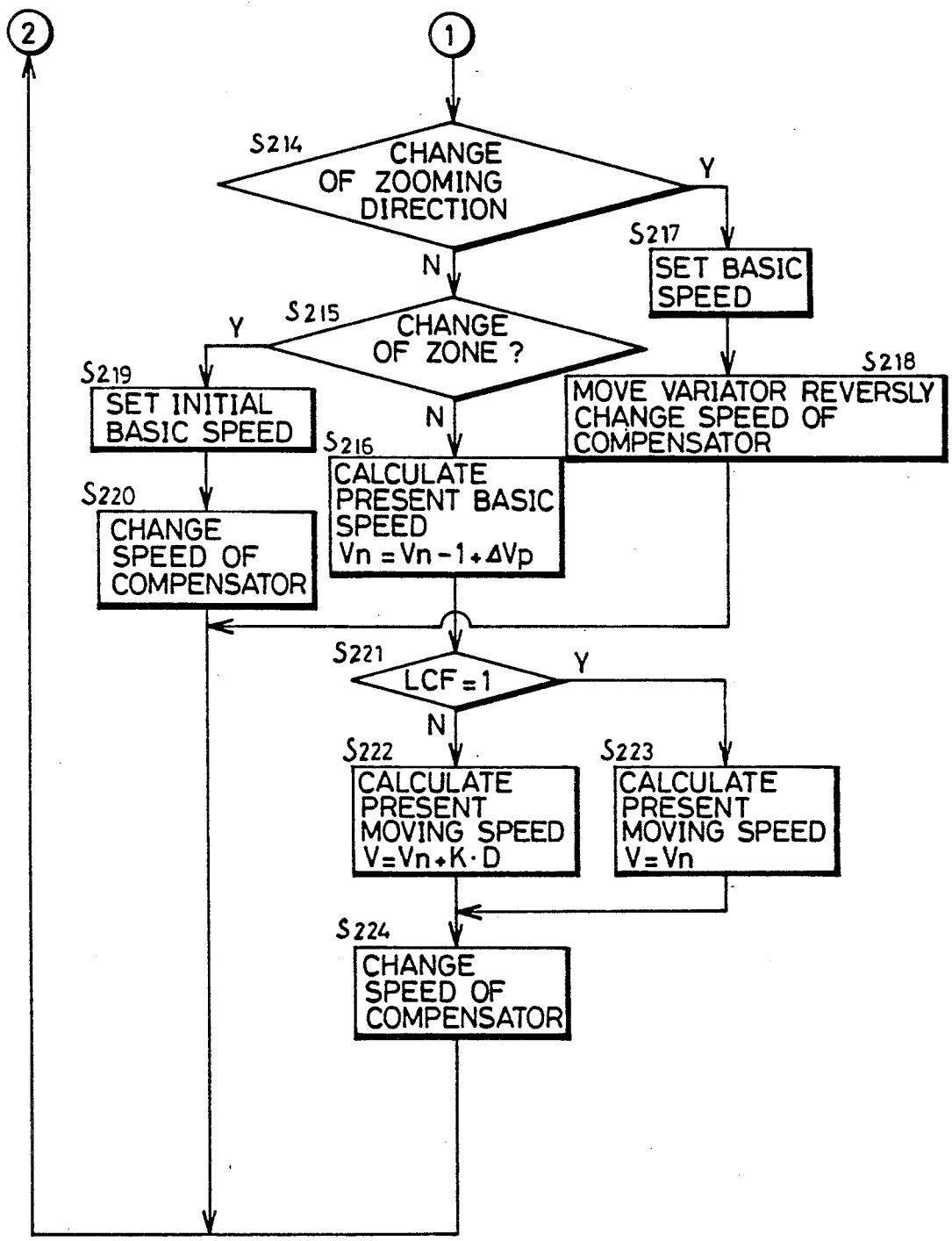

A third embodiment of the present invention will be described in the following. According to the previously described first embodiment, an ideal basic speed is obtained based on information of elapsed time related with focus detection cycles, while according to the third embodiment, a basic speed is obtained based on the moving amount of the compensator lens 103. The entire construction of the automatic focusing apparatus of the third embodiment may be that of the second embodiment. However, it is necessary to detect the position of the compensator lens 103 more finely compared with the second embodiment. FIG. 13A and 13B are flow charts showing operation of the third embodiment. Compared with the first embodiment shown in FIGS. 7A and 7B, the processing in step S216 is different. More specifically, $\Delta Vp$ is a value defined by the position of the compensator lens 103 and a table, which stores the value of $\Delta Vp$ by using the signal of the focus encoder as an address, may be prepared.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A focus adjusting apparatus, comprising:
   a photo-taking lens system, in which the focus has to be adjusted every time the focal length is changed, including at least a first lens unit for changing the focal length by means of its movement through a plurality of zones along an optical axis of the photo-taking lens during a zooming operation and a second lens unit for adjusting the focus by means of its movement along the optical axis; and
   means for controlling the speed of the second lens unit during the zooming operation based on a basic speed determined on the basis of focal length of the photo-taking lens system, the basic speed being changed as a function of the time the first lens unit is in each respective zone during the zooming operation.

2. A focus adjusting apparatus claimed in claim 1, further comprising means for detecting the focus condition of the photo-taking lens system by using the light passing through the photo-taking lens system, wherein the control means further uses the result detected by the focus detecting means for controlling the speed of the second lens unit.

3. A focus adjusting apparatus claimed in claim 2, wherein the control means further uses the reliability of the result detected by the focus detecting means for controlling the speed of the second lens unit.

4. A focus adjusting apparatus claimed in claim 3, wherein the focus detecting means detects the focus condition according to a phase difference detecting method using a pair of CCD line sensors and the reliability is determined by the correlation between the outputs of the CCD line sensors.

5. A focus adjusting apparatus claimed in claim 2, wherein the result detected by the focus detecting means is the defocus amount with respect to the photo-taking lens system.

6. A focus adjusting apparatus claimed in claim 2, wherein the lapse of time corresponds to an interval at which the focus detecting means detects a focusing condition.

7. A focus adjusting apparatus claimed in claim 1, further comprising means for detecting an object distance, wherein the control means further uses the object distance for controlling the speed of the second lens unit.

8. A focus adjusting apparatus, comprising:
   a photo-taking lens system, in which the focus has to be adjusted every time the focal length is changed, including at least a first lens unit for changing the focal length by means of its movement along an optical axis of the photo-taking lens during a zooming operation and a second lens unit for adjusting the focus by means of its movement along the optical axis;
   first means for detecting the defocus amount with respect to the photo-taking lens system by using the light passing through the photo-taking lens system;
   second means for detecting the focal length of the photo-taking lens system;

means for outputting a defocus compensation coefficient corresponding to the detected focal length for obtaining a speed correction amount from the detected defocus amount;

means for converting the defocus amount into the speed of the second lens unit using the detected defocus amount and the defocus compensation coefficient; and means for controlling the speed of the second lens unit during the zooming operation based on the converted value.

9. A focus adjusting apparatus claimed in claim 8, wherein the converting means further uses the reliability of the defocus amount detected by the detecting means for controlling the speed of the second lens unit.

10. A focus adjusting apparatus claimed in claim 9, wherein the first detecting means detects the defocus amount according to a phase difference detecting method using a pair of CCD line sensors and the reliability is determined by the correlation between the outputs of the CCD line sensors.

11. A focus adjusting apparatus claimed in claim 8, further comprising third means for detecting an object distance, wherein the control means further uses the object distance for controlling the speed of the second lens unit.

12. A focus adjusting apparatus claimed in claim 8, wherein the converting means includes a ROM table which memorizes the defocus compensation coefficient and is addressed by the focal length.

13. A focus adjusting apparatus, comprising:
a photo-taking lens system, in which the focus has to be adjusted every time the focal length is changed, including at least a first lens unit for changing the focal length by means of its movement along an optical axis of the photo-taking lens during a zooming operation and a second lens unit for adjusting the focus by means of its movement along an optical axis of the photo-taking lens during the zooming operation; and means for controlling the speed of the second lens unit during the zooming operation based on the focal length of the photo-taking lens system and the absolute position of the second lens unit along the optical axis of the photo-taking lens system.

14. A focus adjusting apparatus claimed in claim 13, further comprising means for detecting the focus condition of the photo-taking lens system by using the light passing through the photo-taking lens system, wherein the control means further uses the result detected by the focus detecting means for controlling the speed of the second lens unit.

15. A focus adjusting apparatus claimed in claim 14, wherein the control means further uses the reliability of the result detected by the focus detecting means for controlling the speed of the second lens unit.

16. A focus adjusting apparatus claimed in claim 15, wherein the focus detecting means detects the focus condition according to a phase difference detecting method using a pair of CCD line sensors and the reliability is determined by the correlation between the outputs of the CCD line sensors.

17. A focus adjusting apparatus claimed in claim 14, wherein the result detected by the focus detecting means is the defocus amount with respect to the photo-taking lens system.

18. A focus adjusting apparatus, comprising:
a photo-taking lens system, in which the focus has to be adjusted every time the focal length is changed, including at least a first lens unit for changing the focal length by means of its movement along an optical axis of the photo-taking lens during a zooming operation and a second lens unit for adjusting the focus by means of its movement along the optical axis;

means for detecting the focus condition of the photo-taking lens system using the light passing through the photo-taking lens system;

means for determining whether or not the detected focus condition is available; and means for controlling the movement of the second lens unit at a predetermined speed when the determining means determines that the detected focus condition is unavailable, and at speed variable in accordance with the reliability of the detected focus condition when the determining means determines that the detected focus condition is available.

19. A focus adjusting apparatus claimed in claim 18, wherein the focus detecting means detects the focus condition according to a phase difference detecting method using a pair of CCD line sensors and the reliability is determined by the correlation between the outputs of the CCD line sensors.

20. A focus adjusting apparatus claimed in claim 18, wherein the result detected by the focus detecting means is the defocus amount with respect to the photo-taking lens system and the controlling means uses the defocus amount.

21. A focus adjusting apparatus claimed in claim 18, further comprising means for detecting the object distance, wherein the control means further uses the object distance for controlling the speed of the second lens unit.

22. A focus adjusting apparatus claimed in claim 8, further comprising means for storing the coefficient corresponding to the focal length connected to said means for calculating.

* * * * *